(12) United States Patent
Novakovic et al.

(10) Patent No.: US 11,716,015 B2
(45) Date of Patent: Aug. 1, 2023

(54) LOW QUIESCENT CURRENT STARTUP CIRCUIT

(71) Applicant: Rockwell Automation Technologies, Inc., Mayfield Heights, OH (US)

(72) Inventors: Bora Novakovic, Thiensville, WI (US); Jatinkumar K. Patel, Thiensville, WI (US); Rangarajan M. Tallam, Germantown, WI (US); Robert W. Reese, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 149 days.

(21) Appl. No.: 17/174,072

(22) Filed: Feb. 11, 2021

(65) Prior Publication Data
US 2022/0255421 A1    Aug. 11, 2022

(51) Int. Cl.
    *H02M 1/36*     (2007.01)
    *H02M 3/06*     (2006.01)
    *H02M 3/158*    (2006.01)
    *H02M 1/00*     (2006.01)

(52) U.S. Cl.
    CPC .............. *H02M 1/36* (2013.01); *H02M 3/06* (2013.01); *H02M 3/158* (2013.01); *H02M 1/0032* (2021.05)

(58) Field of Classification Search
    CPC .......... H02M 1/36; H02M 3/06; H02M 3/158; H02M 1/0032; H02M 1/0006; H02M 1/327; H02M 3/33523
    See application file for complete search history.

(56) References Cited

U.S. PATENT DOCUMENTS

| 5,640,317 A | 6/1997 | Lei |
| 6,246,596 B1 | 6/2001 | Yamazaki |
| 9,742,262 B1 * | 8/2017 | Jutras ..................... H02M 3/335 |

(Continued)

FOREIGN PATENT DOCUMENTS

| CN | 111277130 | * | 6/2020 | .............. H02M 1/36 |
| WO | 2009095890 A2 | | 8/2009 | |

OTHER PUBLICATIONS

Attached translated version of foreign patent CN111277130. (Year: 2020).*

(Continued)

*Primary Examiner* — Shawki S Ismail
*Assistant Examiner* — Htet Z Kyaw (57) ABSTRACT

A switch mode power supply includes a bootstrap circuit, control circuits, and an auxiliary winding coupled to the bootstrap circuit and configured to supply power to the control circuits after startup of the power supply. The bootstrap circuit is configured to supply power to the control circuits during startup and includes an isolation circuit to limit current flow between the starting capacitor and the control circuits while the starting capacitor is charged to a starting voltage by the high voltage input. During the initial charge of the starting capacitor, the control circuits do not have power to provide the initial functionality of the power supply. Once the starting capacitor is charged to the starting voltage, the isolation circuit is activated to allow current flow that powers the control circuits during the remainder of the startup until the auxiliary winding is able to power the control circuits.

20 Claims, 8 Drawing Sheets

(56) References Cited

U.S. PATENT DOCUMENTS

| | | | |
|---|---|---|---|
| 10,256,715 B2 | 4/2019 | Nate | |
| 2002/0021575 A1* | 2/2002 | Yasumura | H02M 3/01 |
| | | | 363/21.04 |
| 2004/0109334 A1* | 6/2004 | Murakami | H02M 3/3385 |
| | | | 363/49 |
| 2010/0309689 A1* | 12/2010 | Coulson | H02M 3/33507 |
| | | | 363/16 |
| 2013/0021013 A1* | 1/2013 | Kondou | H02M 1/36 |
| | | | 323/283 |
| 2014/0306717 A1* | 10/2014 | Feenstra | G01R 31/67 |
| | | | 324/543 |
| 2017/0054376 A1* | 2/2017 | Quigley | H02M 3/33507 |
| 2018/0358893 A1* | 12/2018 | Yamabe | H02M 3/33523 |
| 2020/0328590 A1* | 10/2020 | Yu | H02M 1/32 |
| 2021/0119526 A1* | 4/2021 | Chung | H02M 3/33523 |

OTHER PUBLICATIONS

Extended European Search Report for EP Application No. 22152015.8; dated Jul. 7, 2022; 9 pages.

* cited by examiner

LOW QUIESCENT CURRENT STARTUP CIRCUIT

BACKGROUND

Electric systems often have startup circuits, also called bootstrap circuits, within the power supply to provide power to low voltage control circuitry needed to provide the initial functionality to start the power supply and allow the full power supply to start up. These startup circuits can be quite simple when the low voltage control circuitry providing the initial functionality are simple, small loads, and/or configured to limit quiescent current pull. However, these startup circuits may quickly become quite complex and expensive to implement when the low voltage control circuitry draws larger amounts of quiescent current or when the control circuitry becomes more complex with larger loads.

SUMMARY

To address the need for more complex low voltage control circuitry, a solution described herein includes a bootstrap circuit (i.e., a startup circuit) within a high-voltage switch mode power supply. The switch mode power supply includes control circuits, an auxiliary winding coupled to the bootstrap circuit and configured to supply power to the control circuits after startup of the power supply. The bootstrap circuit is configured to supply power to the control circuits during the startup time period and may include a starting resistor coupled to a high voltage input, a starting capacitor coupled in series to the starting resistor and configured to be charged to a starting voltage by the high voltage input via the starting resistor during an initial charge time. During the initial charge of the starting capacitor, the control circuits are not powered (the current does not flow to the control circuits) and the power supply does not start. The bootstrap circuit also includes an output coupled to the control circuits, an auxiliary capacitor coupled to the output, and an isolation circuit coupled between the starting resistor and the output and in parallel with the auxiliary capacitor. The isolation circuit is configured to limit current flow between a) the control circuits and b) the starting resistor and the starting capacitor until the starting capacitor is charged to the starting voltage. After the starting capacitor is charged to the starting voltage, the isolation circuit is configured to activate (i.e., allow current flow to the auxiliary capacitor and control circuits).

Implementations may include one or more of the following features. In some embodiments, the starting capacitor and auxiliary capacitor are configured and sized to store a sufficient charge to power the control circuits during the startup time after the initial charge.

In some embodiments, the starting resistor may have a resistance value that ensures the initial charge time is less than ten seconds.

In some embodiments, the high voltage input has a broad operating range of, for example, between two hundred and twelve hundred volts.

In some embodiments, the isolation circuit is configured to deactivate when the starting capacitor falls below a low voltage threshold, and the low voltage threshold is configured to be below the voltage of the starting capacitor at the end of the startup time such that the isolation circuit does not deactivate.

In some embodiments, the isolation circuit may include a voltage limiting diode in parallel with the auxiliary capacitor configured to activate to limit the starting capacitor voltage based on an operating voltage specification of the control circuits.

In some embodiments, the isolation circuit may include a diode configured to define the starting voltage, a main switching device coupled between the starting capacitor and the diode and configured to activate when the starting capacitor is charged to the starting voltage, and a transistor configured to create hysteresis between the starting voltage and the low voltage threshold. The main switching device may include a bipolar junction transistor ("BJT"). The main switching device may include a metal-oxide-semiconductor field-effect transistor ("MOSFET").

In some embodiments, the isolation circuit may include a load switch. The input of the load switch may be coupled to the starting capacitor, and the output of the load switch may be coupled to the output of the bootstrap circuit. The isolation circuit may also include a first resistor coupled between a quick output discharge port of the load switch and an enable port of the load switch and a second resistor coupled between the input of the load switch and the enable port of the load switch. The first resistor and the second resistor may be configured to define a low voltage threshold, and the isolation circuit may be configured to deactivate when the starting capacitor voltage is below the low voltage threshold. The low voltage threshold may be configured such that the voltage of the starting capacitor at the end of the startup time remains above the low voltage threshold.

In some embodiments, the isolation circuit may include a linear regulator. The input of the linear regulator may be coupled to the starting capacitor, and the output of the linear regulator may be coupled to the output of the bootstrap circuit. The isolation circuit may include a first diode coupled between the input of the linear regulator and the enable port of the linear regulator, and the first diode may be configured to define the starting voltage. The isolation circuit may also include a second diode coupled between the input of the linear regulator and the output of the linear regulator.

Some implementations include a method for configuring a switch mode power supply ("SMPS"). The method may include configuring the SMPS to charge a starting capacitor to a threshold charge voltage during an initial charging time. In response to the starting capacitor reaching the threshold charge voltage, the SMPS is configured to activate an isolation circuit to electrically couple the starting capacitor to an auxiliary capacitor and one or more control circuits. The SMPS may also be configured to charge the auxiliary capacitor with the starting capacitor during a startup time and power the control circuits with the starting capacitor until an auxiliary winding begins providing power to the bootstrap circuit (i.e., startup is complete).

Implementations of the method may include one or more of the following features. In some embodiments, the method may include configuring the SMPS to maintain activation of the isolation circuit after the startup time.

In some embodiments, the SMPS is configured such that the initial charging time is less than ten seconds.

In some embodiments, the SMPS is configured to deactivate the isolation circuit to electrically isolate the starting capacitor from the auxiliary capacitor and the control circuits when the starting capacitor voltage falls below a low voltage threshold. The low voltage threshold is configured such that the starting capacitor voltage at the end of the startup time remains above the low voltage threshold.

In some embodiments, the isolation circuit may include a load switch. The method may include configuring the switch mode power supply to limit the voltage of the starting capacitor using a voltage limiting diode based on the control circuit load.

BRIEF DESCRIPTION OF THE DRAWINGS

Many aspects of the disclosure can be better understood with reference to the following drawings. The components in the drawings are not necessarily drawn to scale. Some components or operations may not be separated into different blocks or may be combined into a single block for the purposes of discussion of some embodiments. Moreover, in the drawings, like reference numerals designate corresponding parts throughout the several views. While several embodiments are described in connection with these drawings, the disclosure is not limited to the embodiments disclosed herein. The technology is amendable to various modifications and alternative forms. The disclosure and figures herein are intended to provide a description of certain embodiments, and the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In many systems that utilize a high voltage power supply, including switch mode power supplies, the power supply and system has a startup period in which the inductors and capacitors are charged and the power supply itself is started. During this startup period, the power supply does not have full functionality. Further, in the power supply, there are control circuits that are typically low voltage that are needed to start (i.e., boot) the power supply. A bootstrap circuit in the power supply typically provides current to the control circuits directly from the high voltage input. After the power supply starts, it can power the control circuits through one of its own low voltage supply outputs, referred to herein as an auxiliary circuit or auxiliary winding.

In systems having a simple control circuit, which is typically an integrated chip with functionality for limiting quiescent current, the bootstrap circuit can be quite simple with a starting resistor (e.g., a string of resistors coupled to the high voltage input) coupled to a starting capacitor. In such simple systems, the capacitor is charged via the resistor until the voltage reaches the starting threshold. Once the capacitor reaches the starting voltage threshold, it discharges to supply power to the control circuit and maintains the voltage levels by the balance of the charge current from the high voltage input via the resistors and the discharge current supplying the control circuit while the power supply starts. Once the power supply is started, the control circuits are powered by the auxiliary circuit of the power supply.

While these simple systems are straightforward, design of the system becomes much more complicated when the input voltages for the power supply to start and operate are from a broad range (e.g., 200 Volts to 1400 Volts). Additional complications arise when additional control circuits are connected to the bootstrap circuit. For example, additional circuits may be used when the power supply has functional safety requirements, wide input/output operating ranges, multipole outputs, silicon-carbide (SiC) switches, and the like. These additional circuits may draw large amounts of quiescent current. This draw causes increased power dissipation in the starting resistor, which can create thermal issues that may lead to failure of the power supply (e.g., the power supply cannot start). The resistor must have low enough resistance to supply the control circuits and reach the threshold voltage across the capacitor while also being high enough to meet power dissipation derating criteria. If the resistance is too high, the power supply will not power up, and if the resistance is too low, the resistors will overheat. To make the circuit thermally viable, the starting resistor has to be increased, which is space consuming and more expensive. In some systems, there is not sufficient space and/or the cooling requirements may not allow for the necessary size resistors. Accordingly, a simple bootstrap circuit having only a resistor or resistor string and capacitor may not be sufficient to ensure proper startup and functionality of the power supply.

To address the above issues, described herein is a bootstrap circuit that will include an isolation circuit to isolate the starting resistors and capacitor from the low voltage control circuits during initial charge of the starting capacitor. Upon charging the starting capacitor, the isolation circuit will be activated and the current from the starting capacitor can flow to the control circuits during startup to provide the power for the control circuits to complete startup of the power supply. The isolation circuit is configured to remain active in the power supply during normal operation and exhibits a hysteresis during startup to ensure that the power supply has sufficient time to startup before the isolation circuit deactivates. Implementation details of embodiments are provided in the following figures.

Figure 1:
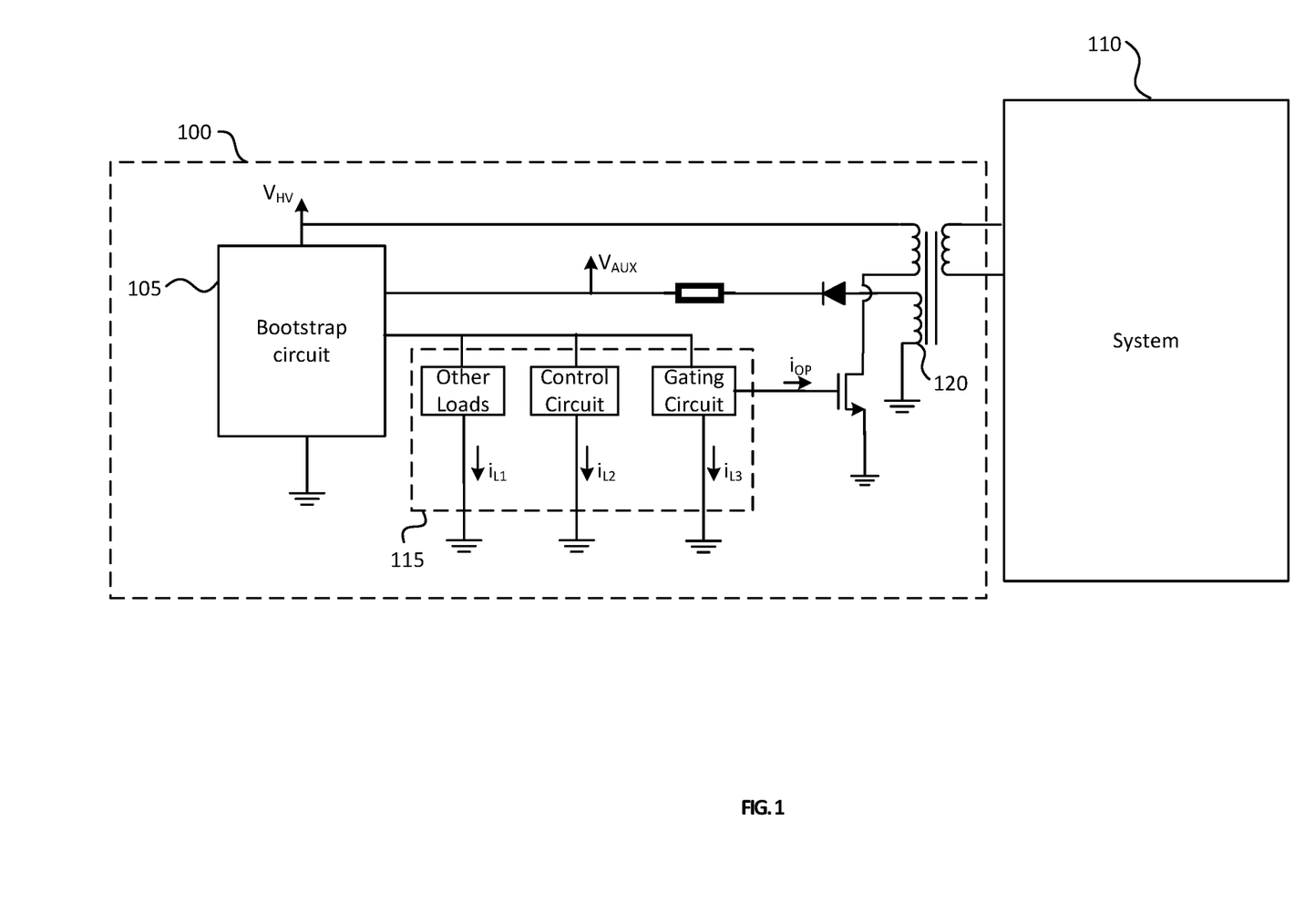
FIG. 1 illustrates a simplified schematic of a switch mode power supply ("SMPS"), according to some embodiments.

FIG. 1 illustrates a simplified schematic of a power supply 100. The power supply 100 may be a switch mode power supply ("SMPS"). The SMPS may be direct current ("DC") to DC. In some embodiments, the power supply is a high voltage power supply. The power supply 100 provides power to system 110. System 110 may be any system that uses a power supply including, for example, in industrial automation environments. System 110 may be an standard motor drive, a programmable logic controller, or any other machine or system that uses a low voltage power supply. For example, power supply 100 may be a high voltage DC to low voltage DC SMPS, and the system 110 may be a standard motor drive control system.

The power supply 100 includes a bootstrap circuit 105, loads 115, and an auxiliary winding 120. The bootstrap circuit 105 may be used to power the loads 115 during startup of the power supply 100. After startup, the auxiliary winding 120, which may be a low-voltage output of the power supply 100, may be used to power the loads 115 during normal operation of the power supply 100.

Details of the bootstrap circuit 105 are described in further detail in FIGS. 2-7. The loads 115 may include any circuitry used for startup and operation of the power supply including, for example, a control circuit, a gating circuit, and any other loads that may be incorporated into the power supply 100. For example, the other loads may include linear regulators, charge pumps, limiting Zener diodes, functional safety circuits, and the like.

Startup current flowing through the starting resistor in the bootstrap circuit 105 (shown in more detail in FIGS. 2-7) can be evaluated as the sum of quiescent currents for all loads connected at the $V_{AUX}$ at threshold voltage when gating turns on and the operating current $i_{OP}$ starts to flow. Accordingly, the maximum quiescent current is equal to $i_{L1}+i_{L2}+i_{L3}$. For conventional bootstrap circuits (consisting of a startup resistor and capacitor), values for the starting resistor are dependent upon the maximum quiescent current otherwise the power supply 100 may not start. The resistance values must be low enough to adequately supply the loads 115 and reach the threshold voltage across the starting capacitor and must also be high enough to meet power dissipation derating criteria. If the starting resistor resistance is too high, the power supply 100 will not power up. If the starting resistor resistance is too low, the resistors will overheat. Accordingly, a solution implemented in bootstrap circuit 105 is to include an isolation circuit to isolate the starting resistor from the loads 115 so that quiescent current drawn by the loads 115 is zero or very limited. This is described in more detail with respect to FIGS. 2-7.

Figure 2:
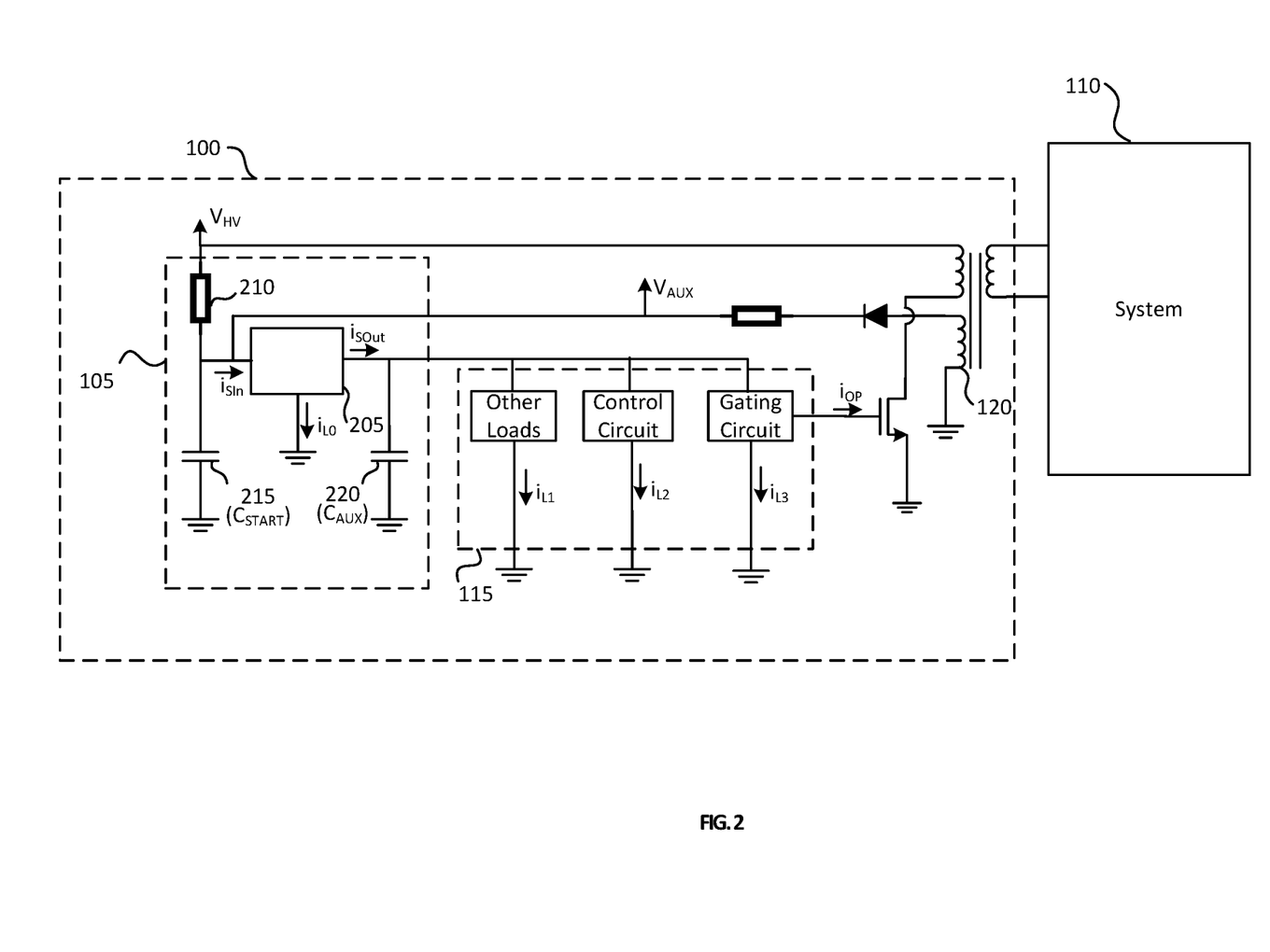
FIG. 2 illustrates a simplified schematic of the SMPS with additional detail of a bootstrap circuit, according to some embodiments.

FIG. 2 illustrates a simplified schematic of more detail of the bootstrap circuit 105 in power supply 100. Note that components having the same reference numerals between figures may be the same or substantially the same component and may be used in various embodiments of the power supply 100 having differing specific circuit implementations as described with respect to each figure. Bootstrap circuit 105 includes starting resistor 210, starting capacitor 215, isolation circuit 205, and auxiliary capacitor 220. The isolation circuit 205 isolates the starting resistor 210 and starting capacitor 215 from the auxiliary capacitor 220 and the loads 115. The isolation circuit 205 leakage is configured to be minimal or zero so that quiescent current pulled is very low, with the isolation circuit 205, quiescent current becomes $i_{L0}$ instead of $i_{L1}+i_{L2}+i_{L3}$. Isolation circuit 205 limiting the quiescent current allows the starting capacitor 215 to charge to the voltage that is high enough, making the stored energy high enough to power the loads 115 during power supply 100 startup until the auxiliary winding 120 provides enough current to charge startup capacitor 215 and auxiliary capacitor 220 for powering the loads 115 during normal operation of the power supply 100. The low quiescent current draw also allows the resistance for starting resistor 210 to be very high. This high resistance value for starting resistor 210 ensures that power dissipation by the starting resistor is limited so that the thermal requirements are easily met (e.g., limiting the danger of overheating). Further, since the starting resistor 210 and the starting capacitor 215 are isolated from the rest of the power supply control circuitry, the high-voltage input is used primarily to charge the starting capacitor 215 until it reaches the threshold starting voltage.

The isolation circuit 205 is configured to have a minimal leakage current $i_{L0}$ and minimal $i_{SIn}$ and $i_{SOut}$ until the isolation circuit is activated. As such, the input and output of the isolation circuit 205 are very high impedance until the starting capacitor 215 voltage reaches the starting voltage threshold. After the starting capacitor 215 reaches the starting voltage threshold, the isolation circuit 205 activates, and $i_{SIn}$ and $i_{SOut}$ should be equal because the isolation circuit 205, when activated, begins operating as either a short between the input and output of the isolation circuit 205 or as a constant output voltage source if a linear regulator is used in the isolation circuit 205, for example. The isolation circuit 205 is also configured such that when the voltage of the starting capacitor 215 falls to a low voltage threshold, the isolation circuit 205 deactivates and again reverts to having very high impedance input and output so that the starting resistor 210 and starting capacitor 215 are isolated from the loads 115 and auxiliary capacitor 220.

Figure 3:
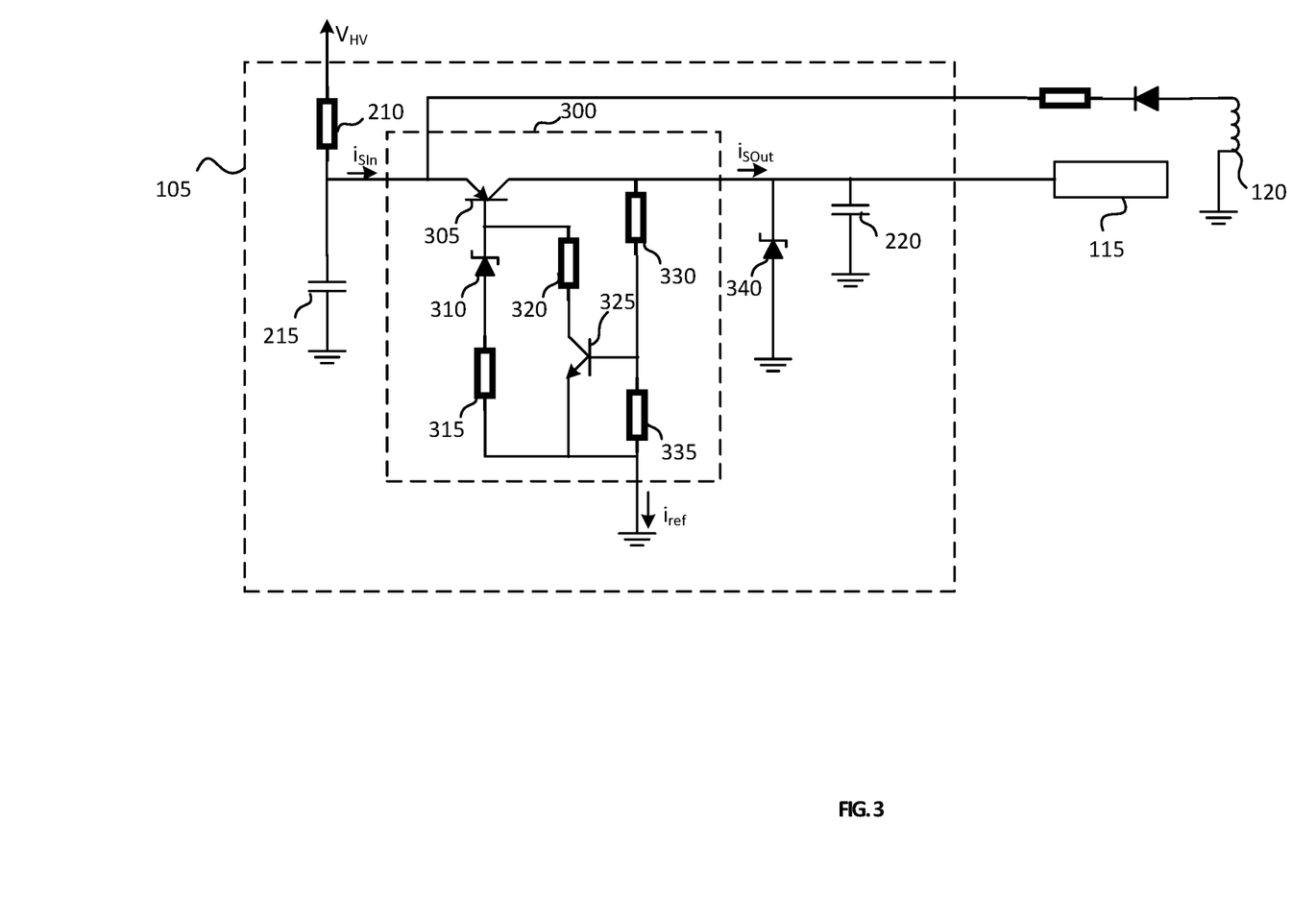
FIG. 3 illustrates a simplified schematic of further detail of the bootstrap circuit, according to some embodiments.

FIG. 3 illustrates a simplified schematic depicting an implementation of an isolation circuit 300. The isolation circuit 300 includes a main switching device 305, a threshold diode 310, resistors 315, 320, 330, and 335, and hysteresis device 325. The bootstrap circuit also includes an optional limiting diode 340.

Figure 7:
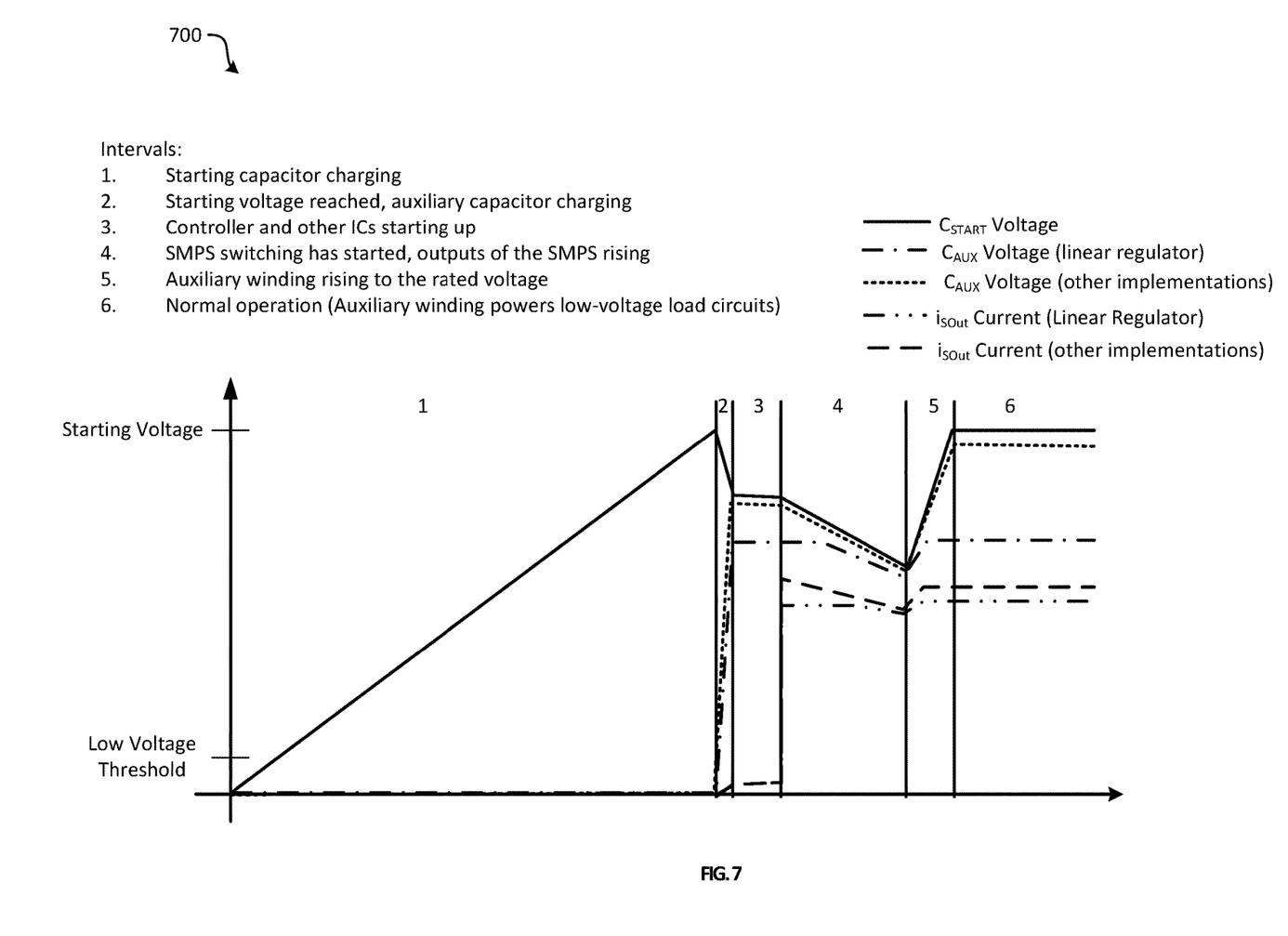
FIG. 7 illustrates a graph of voltage and current values during startup intervals of the SMPS, according to some embodiments.

The main switching device 305 may be a transistor. In some embodiments, the main switching device 305 may be a bipolar junction transistor ("BJT"), and in some embodiments may be a high gain BJT. The main switching device 305 is configured to remain off (not conduct) while the starting capacitor 215 voltage is below the Zener voltage of the threshold diode 310. Threshold diode 310 may be a Zener diode that determines the starting voltage threshold based on the Zener voltage of the threshold diode 310. Once the starting capacitor reaches the Zener voltage (i.e., starting voltage threshold), the main switching device 305 activates and current flows between the input and output of the isolation circuit 300. At the input, the current is $i_{SIn}$, and at the output the current is $i_{SOut}$ as described with respect to FIG. 2. The current flow will charge the auxiliary capacitor 220. Once the auxiliary capacitor 220 voltage reaches the lower voltage threshold (i.e., the voltage at which the isolation circuit 300 deactivates), the hysteresis device 325 will conduct and saturate the main switching device 305. The hysteresis device 325 may be a transistor and, more specifically, may be a BJT. When the main switching device 305 is saturated, the main switching device 305 will charge the auxiliary capacitor 220 to a voltage based on the ratio of the auxiliary capacitor 220 and starting capacitor 215 capacitances and the starting capacitor 215 voltage. When the auxiliary capacitor 220 is charged, the loads 115 will draw the auxiliary capacitor 220 voltage down until either the starting capacitor 215 voltage falls below the low voltage threshold or the auxiliary winding 120 begins supplying the current to the starting capacitor 215 and consequently the auxiliary capacitor 220. Accordingly, the auxiliary capacitor 220 and starting capacitor 215 capacitance values should be selected to ensure that they store sufficient energy so that the auxiliary winding 120 begins charging the starting capacitor 215 and consequently the auxiliary capacitor 220 before the starting capacitor 215 voltage falls below the low voltage threshold. If the starting capacitor 215 falls below the low voltage threshold before the auxiliary winding 120 begins charging the starting capacitor 215 and auxiliary capacitor 220, the isolation circuit 300 will deactivate, isolating the starting capacitor 215 and starting resistor 210, and the power supply 100 will not start. The resistors 315, 320, 330, and 335 may be selected such that $i_{ref}$ current is as low as possible. The limiting diode 340 is an optional diode that may ensure the starting capacitor 215 voltage is limited in the event loads 115 do not draw sufficient current. The graph 700 described with respect to FIG. 7 provides a description of the intervals the isolation circuit experiences and the associated current and voltage values.

Figure 4:
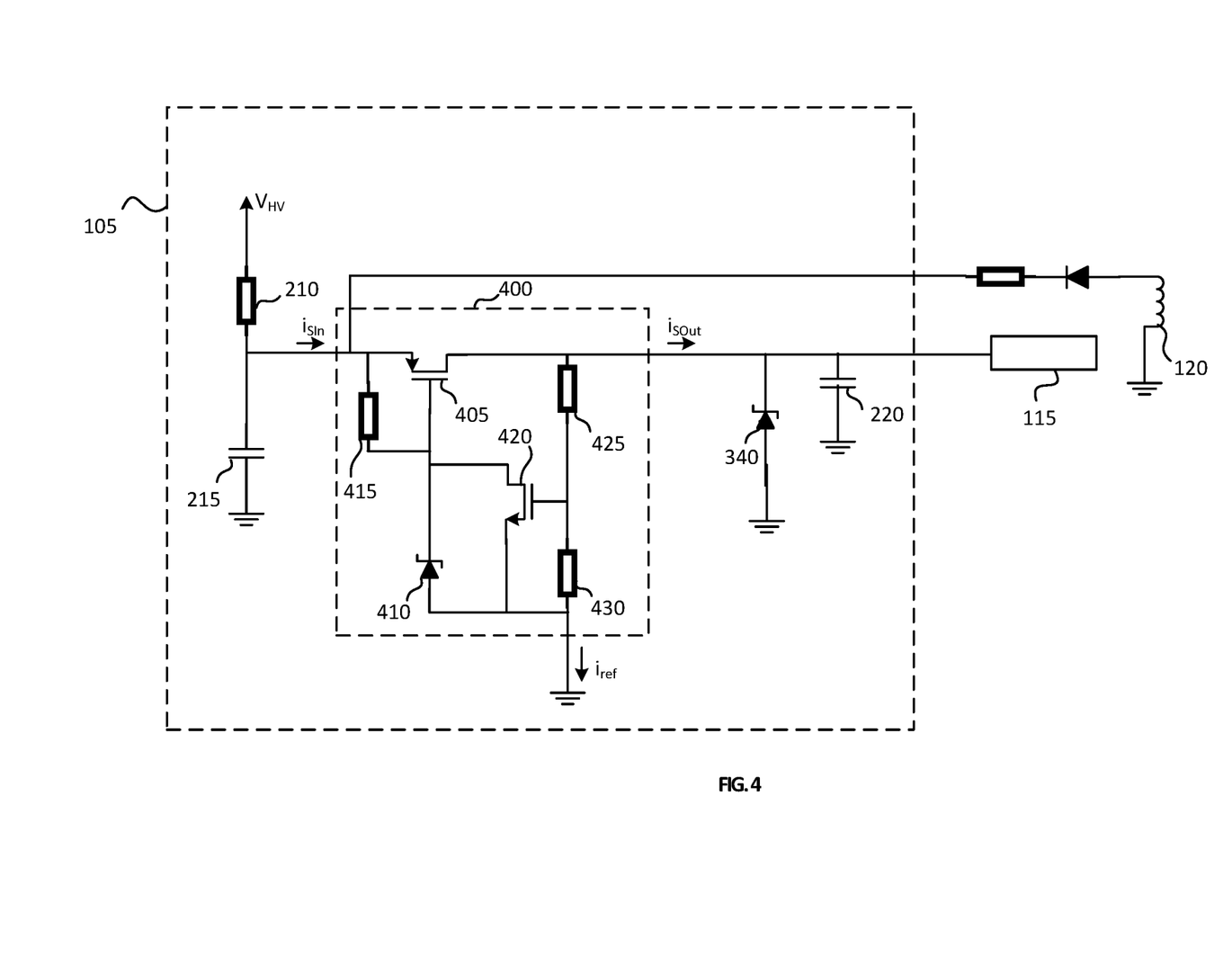
FIG. 4 illustrates a simplified schematic of further detail of the bootstrap circuit, according to some embodiments.

FIG. 4 illustrates a simplified schematic depicting an implementation of an isolation circuit 400. The isolation circuit 400 includes a main switching device 405, a threshold diode 410, resistors 415, 425, and 430, and hysteresis device 420.

The main switching device 405 may be a transistor. In some embodiments, the main switching device 405 may be a metal-oxide semiconductor field-effect transistor ("MOSFET"). The main switching device 405 is configured to remain off (not conduct) while the starting capacitor 215 voltage is below the Zener voltage of the threshold diode 410 plus the main switching device 405 threshold voltage (e.g., MOSFET threshold voltage). Threshold diode 410 may be a Zener diode, and the main switching device may be a MOSFET such that the starting voltage is determined based on the Zener voltage of the threshold diode 410 plus the MOSFET threshold voltage of the main switching device 405. Once the starting capacitor reaches the starting voltage threshold, the main switching device 405 activates and current flows between the input and output of the isolation circuit 400. At the input, the current is $i_{SIn}$, and at the output the current is $i_{SOut}$ as described with respect to FIG. 2. The current flow will charge the auxiliary capacitor 220. Once the auxiliary capacitor 220 voltage reaches the lower voltage threshold (i.e., the voltage at which the isolation circuit 400 deactivates), the hysteresis device 420 will conduct and completely turn the main switching device 405 on. The hysteresis device 420 may be a transistor and, more specifically, may be a MOSFET. When the main switching device 405 is fully on, the main switching device 405 will charge the auxiliary capacitor 220 to a voltage based on the ratio of the auxiliary capacitor 220 and starting capacitor 215 capacitances and the starting capacitor 215 voltage. When the auxiliary capacitor 220 is charged, the loads 115 will draw the auxiliary capacitor 220 voltage down until either the starting capacitor 215 voltage falls below the low voltage threshold or the auxiliary winding 120 begins supplying the current to the starting capacitor 215 and consequently the auxiliary capacitor 220. Accordingly, the auxiliary capacitor 220 and starting capacitor 215 capacitance values should be selected to ensure that they store sufficient energy so that the auxiliary winding 120 begins charging the starting capacitor 215 and consequently the auxiliary capacitor 220 before the starting capacitor 215 voltage falls below the low voltage threshold. If the starting capacitor 215 falls below the low voltage threshold before the auxiliary winding 120 begins charging the starting capacitor 215 and consequently the auxiliary capacitor 220, the isolation circuit 400 will deactivate, isolating the starting capacitor 215 and starting resistor 210, and the power supply 100 will not start. The resistors 415, 425, and 430 may be selected such that $i_{ref}$ current is as low as possible. The graph 700 described with respect to FIG. 7 provides a description of the intervals the isolation circuit experiences and the associated current and voltage values.

Figure 5:
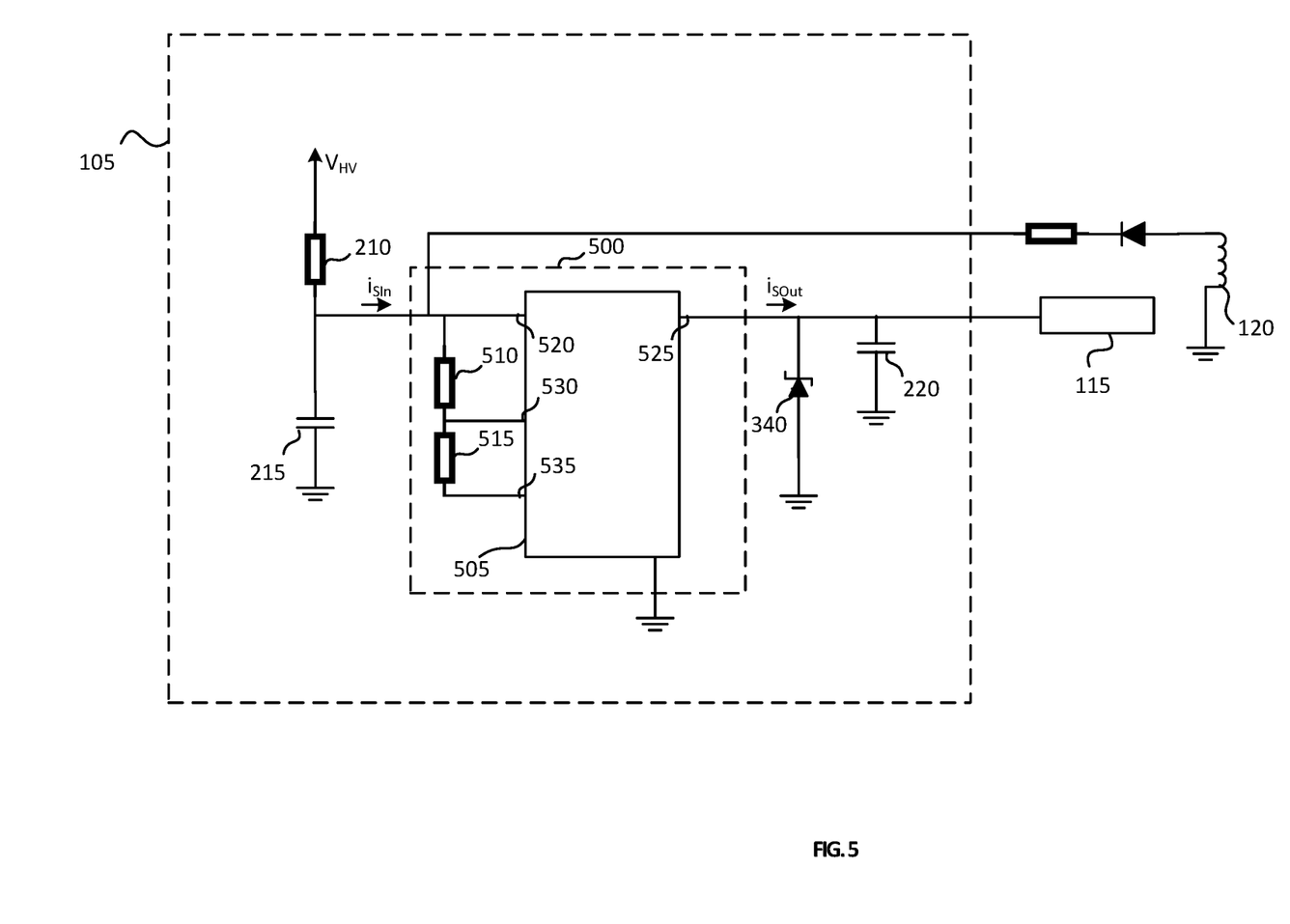
FIG. 5 illustrates a simplified schematic of further detail of the bootstrap circuit, according to some embodiments.

FIG. 5 illustrates a simplified schematic depicting an implementation of an isolation circuit 500. The isolation circuit 500 includes a main switching device 505 and resistors 510 and 515.

The main switching device 505 may be a load switch. As depicted, this is not a conventional configuration for a load switch but is implemented to perform as an isolation circuit 500 that exhibits the desired hysteresis behavior for the bootstrap circuit 105. The main switching device 505 may be an integrated circuit load switch that includes an enable input 530, an open collector quick discharge output 535, a voltage input 520, and a voltage output 525. The impedance of the voltage input 520 and voltage output 525 is very high when the enable input 530 is low and the starting capacitor 215 is below the starting voltage threshold. The starting voltage threshold is determined based on resistors 510 and 515. When the enable input 530 reaches a predefined threshold such that the voltage input 520 is at the starting voltage threshold (i.e., the starting capacitor 215 reaches the starting voltage threshold), the voltage input 520 is shorted to the voltage output 525, activating the isolation circuit 500, and the discharge output 535 is high impedance. The resistors 510 and 515 are configured to set the low voltage threshold and create the hysteresis between the starting voltage and the low voltage threshold. When the main switching device 505 is activated, the main switching device 505 will charge the auxiliary capacitor 220 to a voltage based on the ratio of the auxiliary capacitor 220 and starting capacitor 215 capacitances and the starting capacitor 215 voltage. When the auxiliary capacitor 220 is charged, the loads 115 will draw the auxiliary capacitor 220 voltage down until either the starting capacitor 215 voltage falls below the low voltage threshold or the auxiliary winding 120 begins supplying the current to the starting capacitor 215 and consequently the auxiliary capacitor 220. Accordingly, the auxiliary capacitor 220 and starting capacitor 215 capacitance values should be selected to ensure that they store sufficient energy so that the auxiliary winding 120 begins charging the starting capacitor 215 and consequently the auxiliary capacitor 220 before the starting capacitor 215 voltage falls below the low voltage threshold. If the starting capacitor 215 falls below the low voltage threshold before the auxiliary winding 120 begins charging the starting capacitor 215 and consequently the auxiliary capacitor 220, the isolation circuit 500 will deactivate, isolating the starting capacitor 215 and starting resistor 210, and the power supply 100 will not start. The graph 700 described with respect to FIG. 7 provides a description of the intervals the isolation circuit experiences and the associated current and voltage values.

Figure 6:
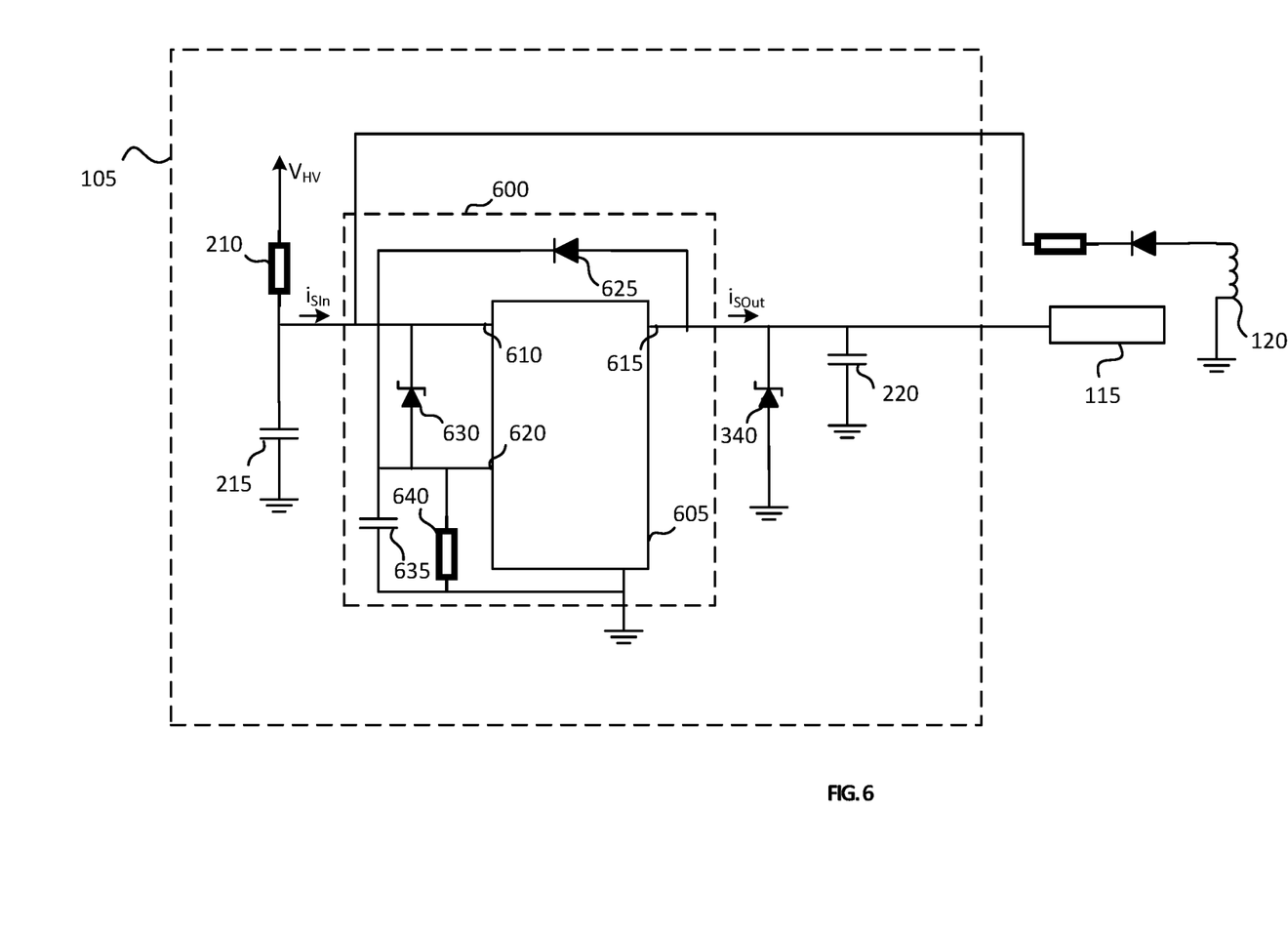
FIG. 6 illustrates a simplified schematic of further detail of the bootstrap circuit, according to some embodiments.

FIG. 6 illustrates a simplified schematic depicting an implementation of an isolation circuit 600. The isolation circuit 600 includes a main switching device 605, threshold diode 630, hysteresis diode 625, resistor 640, and capacitor 635.

The main switching device 605 may be a linear regulator. As depicted, this is not a conventional configuration for a linear regulator but is implemented to perform as an isolation circuit 600 that exhibits the desired hysteresis behavior for the bootstrap circuit 105. The main switching device 605 may be an integrated circuit linear regulator that includes an enable input 620, a voltage input 610, and a voltage output 615. The impedance of the voltage input is very high when the enable input 620 is low and the starting capacitor 215 is below the starting voltage. The threshold diode 630 determines the starting voltage. When the starting capacitor 215 voltage rises to the starting voltage, the threshold diode 630 will conduct and pull the enable input high, activating the isolation circuit 600. While active, the voltage output 615 will rise and stay regulated at the predefined or user set voltage depending on the linear regulator implementation. The voltage output 615 will also pull the enable input 620 even higher through the hysteresis diode 625 to facilitate the hysteresis. If the starting capacitor 215 voltage falls below the low voltage threshold, the linear regulator will deactivate and stop conducting. When the main switching device 605 is activated, the main switching device 605 will charge the auxiliary capacitor 220 to the regulated output voltage of the linear regulator or a voltage based on the ratio of the auxiliary capacitor 220 and starting capacitor 215 capacitances and the starting capacitor 215 voltage, whichever is lower. Stated differently, the voltage based on the ratio of the capacitances is output, and the auxiliary capacitor is charged to that voltage, as long as that voltage is below the regulated output voltage of the linear regulator. If that voltage is higher than the regulated output voltage of the linear regulator, the linear regulator will maintain constant output of the regulated output voltage, which charges the auxiliary capacitor to the regulated output voltage, until the input (i.e., starting capacitor voltage) falls below the input regulation voltage of the linear regulator, which in turn lowers the output voltage based on the ratio below the regulated output voltage. When the auxiliary capacitor 220 is charged, the loads 115 will draw the auxiliary capacitor 220 voltage down until either the starting capacitor 215 voltage falls below the low voltage threshold or the auxiliary winding 120 begins supplying the current to the starting capacitor 215 and consequently the auxiliary capacitor 220. Accordingly, the auxiliary capacitor 220 and starting capacitor 215 capacitance values should be selected to ensure that they store sufficient energy so that the auxiliary winding 120 begins charging the starting capacitor 215 and consequently the auxiliary capacitor 220 before the starting capacitor 215 voltage falls below the low voltage threshold. If the starting capacitor 215 falls below the low voltage threshold before the auxiliary winding 120 begins charging the starting capacitor 215 and consequently the auxiliary capacitor 220, the isolation circuit 600 will deactivate, isolating the starting capacitor 215 and starting resistor 210, and the power supply 100 will not start. The graph 700 described with respect to FIG. 7 provides a description of the intervals the isolation circuit experiences and the associated current and voltage values.

In each of the embodiments of the isolation circuits 300, 400, 500, 600, the isolation circuits remain active and conducting during normal operation of the power supply 100. Maintaining the isolation circuit active during normal operation of the power supply 100 avoids having additional circuitry to remove the bootstrap circuit or isolation circuit from the active circuitry of the power supply 100.

FIG. 7 illustrates a graph 700 depicting the voltage and current behavior of the components described in the bootstrap circuit 105. The graph is divided into six intervals. In the first interval, the starting capacitor is charging from the high-voltage input via the starting resistor and the isolation circuit is not yet activated because the starting capacitor has not yet reached the starting voltage. In the second interval, the starting voltage is reached, and the auxiliary capacitor is charged. In the third interval, the control circuits and other integrated circuits (e.g., loads 115) begin starting up. In the fourth interval, the power supply begins switching so that outputs of the power supply begin rising. During this fourth interval, the auxiliary winding is charging. In the fifth interval, the auxiliary winding starts to supply the auxiliary circuit and rises until it reaches the rated voltage (e.g., 15 Volts) to supply the low-voltage circuits (e.g., loads 115). In the sixth interval, the power supply is in normal operation, startup has completed, and the auxiliary winding is at rated voltage and used to power the control circuit loads.

Looking at the starting capacitor voltage ($C_{START}$ Voltage), during the first interval, the starting capacitor voltage rises until it reaches the starting voltage. Once the starting capacitor reaches the starting voltage, the second interval begins, and the auxiliary capacitor is charging, which draws down the voltage of the starting capacitor. During the third interval, the auxiliary capacitor has charged, and the loads begin drawing down the auxiliary capacitor, so the starting capacitor voltage is also drawn down to continue charging the auxiliary capacitor. However, the control circuits have not started the SMPS switching. During the fourth interval, the SMPS switching has started, but the auxiliary winding is still charging and is below the startup capacitor voltage. Therefore, the auxiliary winding does not yet charge the starting capacitor and consequently the auxiliary capacitor, so the auxiliary capacitor continues to draw from the starting capacitor, further lowering the voltage of the starting capacitor. At the beginning of the fifth interval the auxiliary winding voltage reached the startup capacitor voltage. During the fifth interval the auxiliary winding is charging the startup capacitor and consequently the auxiliary capacitor until the starting capacitor and auxiliary winding reach the rated voltage (e.g. 15 Volts) which is above the low voltage threshold. Accordingly, the starting capacitor charges back to the rated operating voltage (e.g., 15 Volts). While the starting voltage and rated operating voltage are equivalent in this example, they may be different values in some embodiments. During the sixth interval, the starting capacitor remains at the rated voltage because it is supplied by the auxiliary winding. The low voltage threshold is determined by the operating voltage specifications of the control circuit. The starting voltage threshold, startup and auxiliary capacitor should be selected such that the starting capacitor voltage does not drop past the low voltage threshold before the auxiliary winding reaches the starting capacitor voltage and starts to charge the startup capacitor and consequently charge auxiliary capacitor and supply the control circuits. If the starting capacitor were to fall below the low voltage threshold during one of the first four intervals, the isolation circuit would deactivate, and the power supply would not complete startup.

Looking at the auxiliary capacitor voltage ($C_{AUX}$ Voltage—linear regulator) in the implementation having the linear regulator, which is depicted in FIG. 6, during the first interval, the auxiliary capacitor voltage is zero because the isolation circuit is blocking current from the auxiliary capacitor, so it is not charged to a voltage. In the second interval, the auxiliary capacitor voltage increases because the isolation circuit is activated, and the starting capacitor charges the auxiliary capacitor. During the third interval, the loads that are powered by the bootstrap circuit and draw voltage from the auxiliary capacitor, but the auxiliary capacitor maintains its charge from the starting capacitor, and since the isolation circuit includes a linear regulator, the voltage at the auxiliary capacitor remains stable. This behavior continues into the fourth interval, but as the starting capacitor voltage drops to the level of the auxiliary capacitor, they both experience voltage drops. During the fifth interval, the auxiliary winding rises to charge the starting capacitor and consequently the auxiliary capacitor, so the auxiliary capacitor voltage increases to the regulated voltage level from the linear regulator and during normal operation remains at the regulated voltage level in the sixth interval.

Looking at the auxiliary capacitor voltage ($C_{AUX}$ Voltage—other implementations) in the implementations other than that having the linear regulator, each of which are depicted in FIGS. 3-5, during the first interval, the auxiliary capacitor voltage is zero because the isolation circuit is blocking current from the auxiliary capacitor, so it is not charged to a voltage. In the second interval, the auxiliary capacitor voltage increases because the isolation circuit is activated, and the starting capacitor charges the auxiliary capacitor. During the third interval, the loads that are powered by the bootstrap circuit during startup draw voltage from the auxiliary capacitor that tracks the fall of the starting capacitor voltage. This behavior continues during the fourth interval. During the fifth interval, the auxiliary winding rises to the voltage high enough to charge the starting capacitor and consequently the auxiliary capacitor, so the auxiliary capacitor voltage increases to the rated voltage level and during normal operation remains at the rated voltage level in the sixth interval.

Looking at the control circuit operating current ($i_{SOut}$ Current—linear regulator) in the implementation having the linear regulator, which is depicted in FIG. 6, during the first interval the current is zero. During the second interval, the current rises slightly as the auxiliary capacitor charges. During the third interval, the current raises further as the loads begin starting up. At the fourth interval, the power supply switching has started, and the $i_{SOut}$ current jumps as a consequence of operating current $i_{OP}$. The operating current is shown in FIGS. 1 and 2, which is the current leaving the gating circuit in loads 115, which causes the power supply to switch for a switch mode power supply. The switch mode power supply may be a high voltage DC to DC power supply that supplies power to low voltage drives, in some embodiments. Near the end of the fourth interval, as the auxiliary capacitor charge falls below the regulating level of the linear regulator, the current correspondingly falls until the fifth interval starts. In the fifth interval, the auxiliary winding reaches the starting capacitor voltage and starts to power the control circuits and charges the startup and auxiliary capacitors and the current starts rising again. The $I_{SOut}$ current increases to the normal operating level and remains there once the auxiliary winding reaches the rated voltage and fully charges the startup and the auxiliary capacitor. During the sixth interval of normal operation the current draw remains constant.

Looking at the control circuit operating current ($i_{SOut}$ Current—other implementations) in the implementation other than the one having the linear regulator, each of which are depicted in FIGS. 3-5, during the first interval the current is zero. During the second interval, the current rises slightly as the auxiliary capacitor charges. During the third interval, the current raises further as the loads begin starting up. At the fourth interval, the power supply switching has started, outputs of the power supply are rising, and the $i_{SOut}$ current jumps as a consequence of operating current $i_{OP}$. The operating current is shown in FIGS. 1 and 2, which is the current leaving the gating circuit in loads 115, which causes the power supply to switch for a switch mode power supply. The switch mode power supply may be a high voltage DC to DC power supply that supplies power to low voltage drives, in some embodiments. During the fourth interval, as the starting and auxiliary capacitor charges fall, the operating current correspondingly falls until the fifth interval when the auxiliary winding reaches the startup capacitor voltage and starts to charge it and consequently supply power to the loads. The operating current increases to the operating level and remains there once the auxiliary capacitor is charged and during the sixth interval of normal operation.

Figure 8:
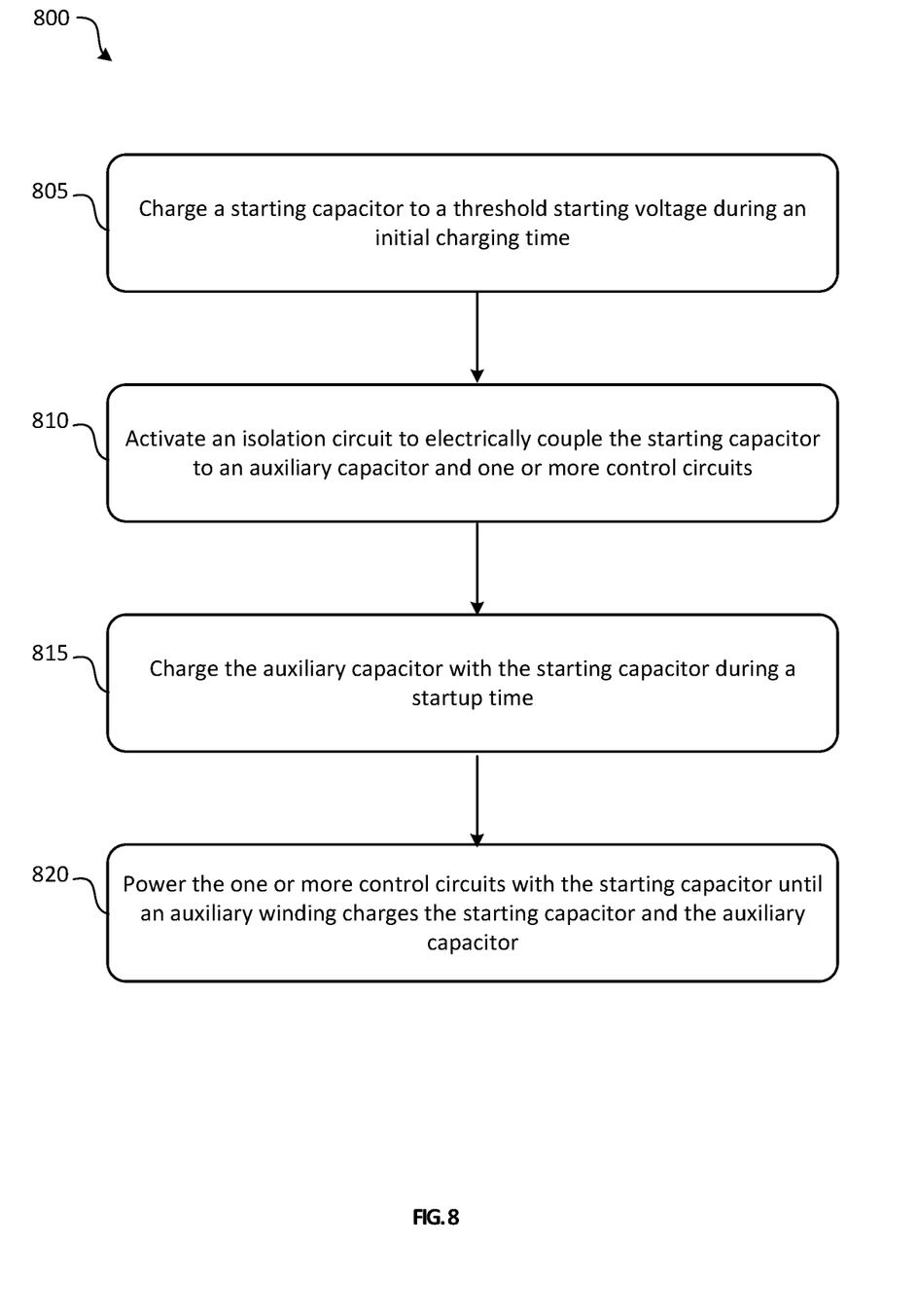
FIG. 8 illustrates a method for configuring the SMPS, according to some embodiments.

FIG. 8 illustrates a method 800 for configuring a power supply bootstrap circuit. The method may include configuring any of the bootstrap circuits described in FIGS. 3-6. At step 805, the bootstrap circuit is configured to charge a starting capacitor to a threshold starting voltage during an initial charging time. For example, the high voltage input is used to charge the starting capacitor 215 via the starting resistor 210, during the first interval (i.e., the initial charging time) as depicted in graph 700. At step 810, the bootstrap circuit is configured to activate an isolation circuit to electrically couple the starting capacitor to an auxiliary capacitor and one or more control circuits. For example, the isolation circuit 205, 300, 400, 500, or 600 activates to allow current flow between the starting capacitor 215 and the auxiliary capacitor 220 and the loads 115. At step 815, the bootstrap circuit is configured to charge the auxiliary capacitor with the starting capacitor during a startup time. For example, the starting capacitor 215 charges the auxiliary capacitor 220 during the intervals two, three, and four as depicted in graph 700 until the auxiliary winding 120 reaches the rated voltage to begin charging the starting capacitor 215 and the auxiliary capacitor 220 to power the loads 115. At step 820, power the control circuits with the starting capacitor until the auxiliary winding charge the auxiliary capacitor. For example, the starting capacitor 215 provides the current to charge the auxiliary capacitor 220 and power the loads 115 until the auxiliary winding 120 reaches the voltage high enough to charge the auxiliary capacitor 220, which then powers the loads 115.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. For example, while this technology is described in a drive, any component having a DC bus may implement the solution described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A switch mode power supply, comprising:
   one or more control circuits;
   an auxiliary winding coupled to a bootstrap circuit and configured to supply power to the one or more control circuits after a startup time period of the switch mode power supply; and
   the bootstrap circuit configured to supply power to the one or more control circuits during the startup time period of the switch mode power supply, the bootstrap circuit comprising:
      a starting circuit comprising:
         a starting resistor coupled to a high voltage input; and
         a starting capacitor coupled in series to the starting resistor and configured to be charged to a starting voltage by the high voltage input via the starting resistor during an initial charge time period of the startup time period;
      an output, coupled to the one or more control circuits;
      an isolation circuit coupled between the starting circuit and the output, wherein the isolation circuit is configured to:
         be inactive to limit current flow including quiescent current between A) the starting circuit and B) all components that are loads on the starting circuit including the one or more control circuits until the starting capacitor is charged to the starting voltage, and
         activate when the starting capacitor is charged to the starting voltage to allow current flow between the starting circuit and the components; and
      an auxiliary capacitor coupled to the output in parallel with the isolation circuit.

2. The switch mode power supply of claim 1, wherein the starting capacitor and auxiliary capacitor are configured to store a sufficient charge to power the one or more control circuits during the startup time period after the initial charge time period.

3. The switch mode power supply of claim 1, wherein the starting resistor comprises a resistance value configured such that the initial charge time period is less than ten seconds.

4. The switch mode power supply of claim 1, wherein a voltage of the high voltage input is between two hundred and twelve hundred volts.

5. The switch mode power supply of claim 1, wherein the isolation circuit is configured to deactivate when a voltage of the starting capacitor is below a low voltage threshold, and the low voltage threshold is below the voltage of the starting capacitor at the end of the startup time period.

6. The switch mode power supply of claim 1, wherein the isolation circuit further comprises a voltage limiting diode in parallel with the auxiliary capacitor, the voltage limiting diode configured to activate to limit a voltage of the starting capacitor based on an operating voltage specification of the one or more control circuits.

7. The switch mode power supply of claim 1, wherein the isolation circuit comprises:
   a diode configured to define the starting voltage;
   a main switching device coupled between the starting capacitor and the diode and configured to activate when the starting capacitor is charged to the starting voltage; and
   a transistor configured to create hysteresis between the starting voltage and a low voltage threshold.

8. The switch mode power supply of claim 7, wherein the main switching device comprises a bipolar junction transistor (BJT).

9. The switch mode power supply of claim 7, wherein the main switching device comprises a metal-oxide-semiconductor field-effect transistor (MOSFET).

10. The switch mode power supply of claim 1, wherein the isolation circuit comprises:

a load switch, wherein an input of the load switch is coupled to the starting capacitor and an output of the load switch is coupled to the output of the bootstrap circuit;

a first resistor coupled between a quick output discharge port of the load switch and an enable port of the load switch; and a second resistor coupled between the input of the load switch and the enable port of the load switch.

11. The switch mode power supply of claim 10, wherein the first resistor and the second resistor are configured to define a low voltage threshold, the isolation circuit is configured to deactivate when a voltage of the starting capacitor is below the low voltage threshold, and the low voltage threshold is below the voltage of the starting capacitor at the end of the startup time period.

12. The switch mode power supply of claim 1, wherein the isolation circuit comprises:

a linear regulator, wherein an input of the linear regulator is coupled to the starting capacitor and an output of the linear regulator is coupled to the output of the bootstrap circuit;

a first diode coupled between the input of the linear regulator and an enable port of the linear regulator, the first diode configured to define the starting voltage; and a second diode coupled between the input of the linear regulator and the output of the linear regulator.

13. A method comprising configuring a switch mode power supply to:

charge a starting capacitor of a bootstrap circuit to a threshold charge voltage during an initial charging time;

during the initial charging time, limit quiescent current drawn by all components that are loads on the starting capacitor with an isolation circuit of the bootstrap circuit, wherein the components comprise one or more control circuits;

in response to a voltage of the starting capacitor reaching the threshold charge voltage, activate the isolation circuit to electrically couple and allow current flow from the starting capacitor to an auxiliary capacitor of the bootstrap circuit and the components;

charge the auxiliary capacitor with the starting capacitor during a startup time; and power the one or more control circuits with the starting capacitor until an auxiliary winding begins providing power to the bootstrap circuit.

14. The method of claim 13, further comprising configuring the switch mode power supply to maintain activation of the isolation circuit after the startup time.

15. The method of claim 13, further comprising configuring the switch mode power supply such that the initial charging time is less than ten seconds.

16. The method of claim 13, further comprising configuring the switch mode power supply to deactivate the isolation circuit to electrically isolate the starting capacitor from the auxiliary capacitor and the one or more control circuits when the voltage of the starting capacitor falls below a low voltage threshold.

17. The method of claim 16, wherein the low voltage threshold is below the voltage of the starting capacitor at the end of the startup time.

18. The method of claim 13, wherein the isolation circuit comprises a load switch.

19. The method of claim 13, further comprising configuring the switch mode power supply to limit the voltage of the starting capacitor using a voltage limiting diode based on a load of the one or more control circuits.

20. The method of claim 13, wherein an input voltage used to charge the starting capacitor is between two hundred and twelve hundred volts.

* * * * *